(12) United States Patent
Fischer et al.

(10) Patent No.: US 7,621,586 B2
(45) Date of Patent: Nov. 24, 2009

(54) SLIDING DOOR ROLLER BRACKET TRACK EXTENSION WITH INTERLOCK

(75) Inventors: David R. Fischer, Bloomfield Hills, MI (US); Teru Tseng, Troy, MI (US); Edward M. Sanocki, Jr., Clawson, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 99 days.

(21) Appl. No.: 12/109,427

(22) Filed: Apr. 25, 2008

(65) Prior Publication Data

US 2009/0267383 A1 Oct. 29, 2009

(51) Int. Cl.
*B60J 5/06* (2006.01)
(52) U.S. Cl. ........................................ 296/155
(58) Field of Classification Search .............. 296/146.1, 296/155; 49/209, 221, 223, 360; 248/298.1, 248/274.1
See application file for complete search history.

(56) References Cited

U.S. PATENT DOCUMENTS

| | | | |
|---|---|---|---|
| 6,036,257 A | | 3/2000 | Manuel |
| 6,328,374 B1 * | | 12/2001 | Patel ........................... 296/155 |
| 6,896,315 B2 * | | 5/2005 | Batinli et al. ................ 296/155 |
| 6,926,342 B2 * | | 8/2005 | Pommeret et al. ........... 296/155 |
| 6,932,417 B2 * | | 8/2005 | Barczynski et al. ......... 296/155 |
| 7,000,977 B2 * | | 2/2006 | Anders ........................ 296/155 |
| 7,243,978 B2 * | | 7/2007 | Mather et al. ............... 296/155 |
| 7,393,044 B2 * | | 7/2008 | Enomoto ..................... 296/155 |

\* cited by examiner

*Primary Examiner*—Glenn Dayoan
*Assistant Examiner*—Gregory Blankenship

(57) ABSTRACT

A motor vehicle has a sliding door supported by front and rear roller brackets that move through corresponding roller tracks. By extending the length of the rear roller track supporting the sliding door to beyond the rear end of the vehicle when the sliding door itself is opened beyond a particular location, a larger door and door opening are possible for any particular vehicle size. This provides better occupant access to rear seats and increases the maximum cargo size that can be loaded through the door opening.

14 Claims, 4 Drawing Sheets

SLIDING DOOR ROLLER BRACKET TRACK EXTENSION WITH INTERLOCK

BACKGROUND OF INVENTION

The present invention relates generally to vehicular sliding doors in which the rearward side of the sliding door is supported by a roller bracket that traverses a roller track mounted along the exterior side of the vehicle.

A typical sliding door for a passenger vehicle such as a van, minivan, or a crossover vehicle is supported and guided by upper and lower roller bracket assemblies at the front edge of the sliding door and a center roller bracket assembly attached to the rear edge of the door. The size of the door opening that may be uncovered when the sliding door opens is limited in the prior art to the available distance of rearward travel for the door. A large door opening is desired for ease of ingress/egress and for maximizing the size of loads that may pass through the door opening. However, door travel is typically limited by the length of the tracks in which the roller bracket assemblies traverse during opening of the sliding door. The center track which receives a roller bracket mounted to the rearward edge of the sliding door has not been able to extend beyond the back edge of the vehicle body. Therefore, the open door space for ingress/egress in prior art vehicles has been undesirably limited.

SUMMARY OF INVENTION

By extending the length of the rear roller track supporting a sliding door to beyond the rear end of the vehicle when the sliding door itself is opened beyond a particular location, a larger door and door opening are possible for any particular vehicle size. This provides better occupant access to rear seats and increases the maximum cargo size that can be loaded through the door opening.

In one preferred aspect of the invention, a sliding door system for a vehicle has a sliding door that slides from a door opening toward a rear end of the vehicle. A roller bracket has a hinged connection at one end for coupling to the sliding door and has orthogonal rollers at the other end. A fixed primary track mounts to a side of the vehicle and extends away from the door opening to a terminus. The primary track has a generally C-shaped cross section with a first vertical load portion and a first horizontal load portion. The first load portions receive the orthogonal rollers. A concentric track bracket mounts to the side of the vehicle and has at least a portion disposed between the terminus of the primary track and the rear end of the vehicle. The concentric track bracket has a generally C-shaped cross section greater than and substantially coaxial with the primary track. A track extension has a first end and an interlock end, the track extension being slidably received in the concentric track bracket between a retracted position and an extended position. The track extension is locked in coaxial abutment with the terminus when in the retracted position. The interlock end extends past the rear end of the vehicle when in the extended position. The track extension has a generally C-shaped cross section with a second vertical load portion and a second horizontal load portion, the second load portions aligned with the first load portions, respectively, for receiving the orthogonal rollers when the roller bracket moves from the primary track to the track extension. When the roller bracket moves in an opening direction from the primary track into the track extension and then to the interlock end, the track extension remains in the retracted position. When the orthogonal rollers enter the interlock end then they are captured and the track extension is released to slide within the concentric track to the extended position. When the track extension returns from the extended position to the retracted position then the orthogonal rollers are released from the interlock end, thereby enabling the roller bracket to slide through the track extension and back into the primary track.

DETAILED DESCRIPTION

Figure 1:
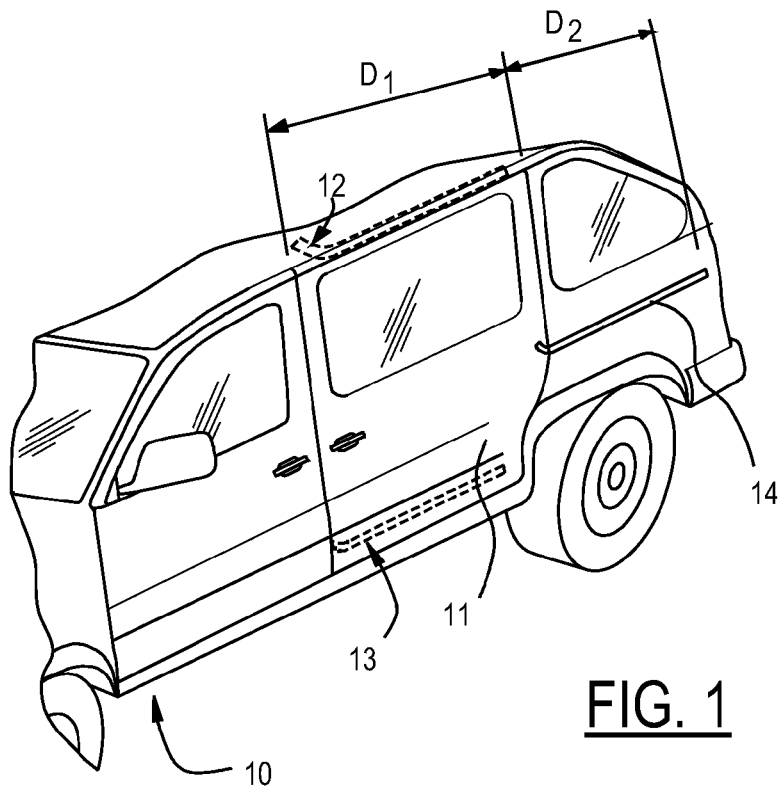
FIG. 1 is a perspective view showing a vehicle with a sliding door in the closed position.

Referring now to FIG. 1, a vehicle 10 has a sliding door 11 supported along an upper roller track 12, a lower roller track 13, and a center roller track 14. Respective roller brackets (not shown) slidable in each track are joined to respective door brackets (not shown) on the interior side of sliding door 11. In a conventional system, a pair of brackets at the top and bottom of the forward edge of sliding door 11 is joined to the roller brackets sliding in tracks 12 and 13, respectively. A door bracket attached at the center rear edge of sliding door 11 is coupled to a roller bracket slidably received in track 14. The tracks have initial portions which move radially outward so that the door first moves outward from the vehicle body in order to clear the vehicle body and then slides toward the rear of vehicle 10. Because of this compound movement, each roller bracket is pivotally connected to its respective door bracket.

Sliding door 11 and the opening in vehicle 10 which receives sliding door 11 each have a front-to-back width designated $D_1$. For conventional sliding doors, the rearward movement of sliding door 11 has a maximum distance designated $D_2$ which is the length of center track 14 from the edge of the door opening to the end of track 14. The space available for track 14 is limited by the overall length of vehicle 10. If distance $D_2$ is less than distance $D_1$, then when a conventional sliding door 11 is at its maximum rearward travel position it continues to block a portion of the door opening. It would be desirable to obtain an extension of the sliding door travel.

Figure 2:
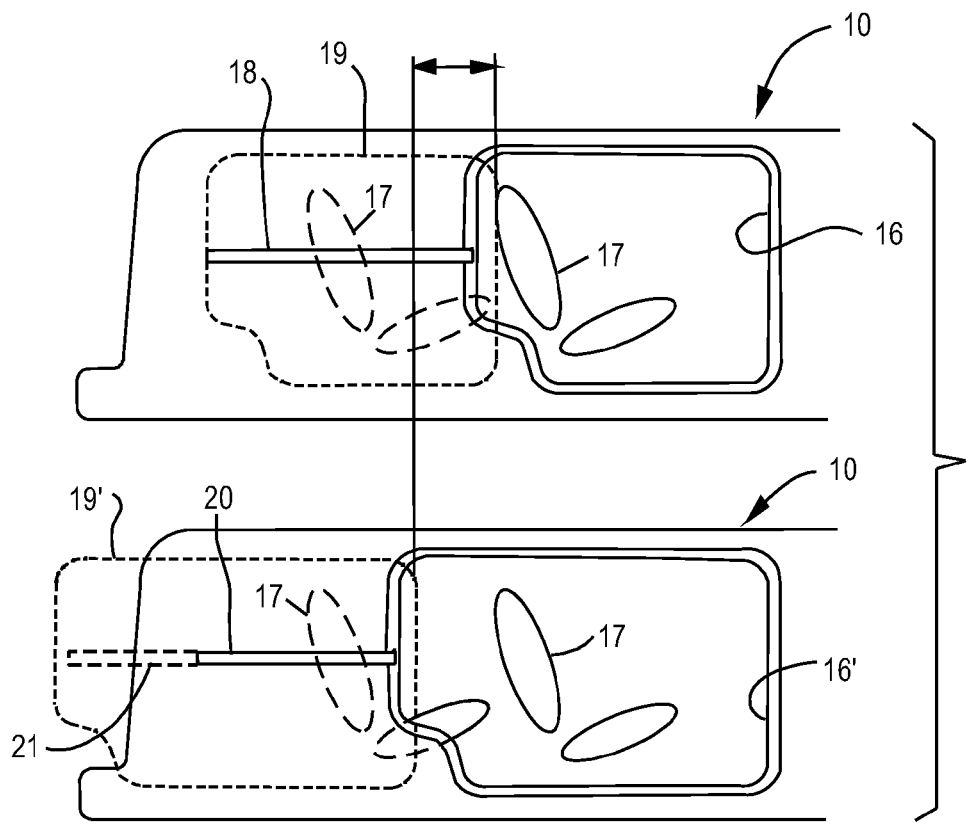
FIG. 2 is a diagram showing the relationship between door opening size and sliding door travel for a vehicle body having a particular length.

As shown in FIG. 2, vehicle 10 may have a side passenger opening 16 allowing ingress to and egress from seats 17. In the upper half of FIG. 2, opening 16 is sufficiently small compared to the length of the vehicle behind opening 16 that a center track 18 can be accommodated on vehicle 10 to allow opening of the sliding door to a position 19 using conventional door sliders. In the lower half of FIG. 2, a larger (i.e., wider) opening 16' allows easier ingress and egress to rear seat 17. However, the remaining length of the vehicle for accommodating a longer track is insufficient. Therefore, the sliding door cannot be moved to a desired position 19' using the conventional sliding door support apparatus. Therefore, in addition to a primary track 20, the present invention employs a track extension 21 that slides rearward beyond the rear end of the vehicle at the appropriate times so that the door is supported over a greater range of movement.

Figure 3:
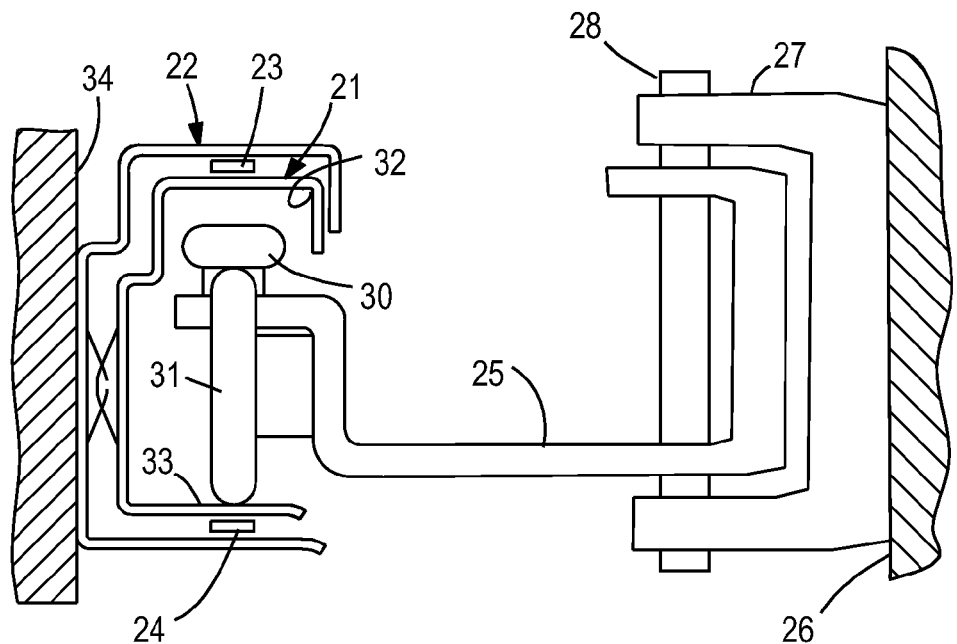
FIG. 3 is an end view of a track system with a roller bracket received in the track extension.

FIG. 3 shows the main elements of the invention including a track extension 21 slidably retained inside a concentric track bracket 22 by means of sliders 23 and 24. A roller bracket 25 is attached to a sliding door 26 via a door bracket 27 and hinge pin 28. Roller bracket 25 has orthogonal rollers 30 and 31 as is known in the art. Track extension 21 has a generally C-shaped cross section with a horizontal load portion 32 for containing roller 30 and a vertical load portion 33 for supporting roller 31. Concentric track bracket 22 has a similar but slightly larger C-shaped cross section for nestingly receiving track extension 21. Concentric track bracket 22 is fixedly mounted to the side of the vehicle 34.

Figure 4:
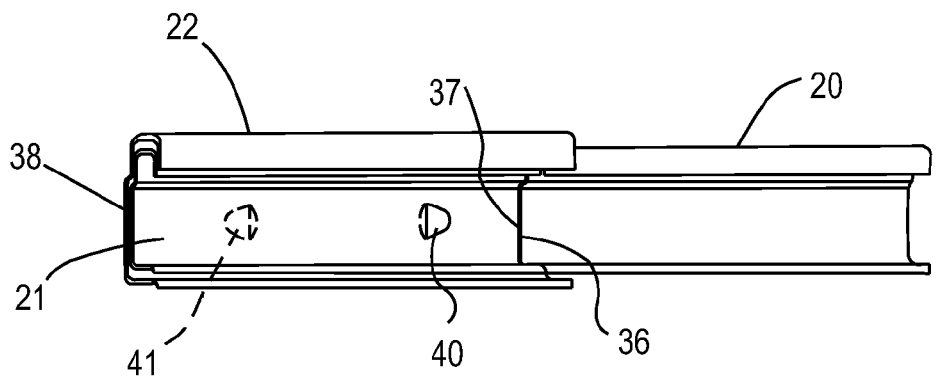
FIG. 4 is a front plan view showing a track extension in the retracted position.
Figure 5:
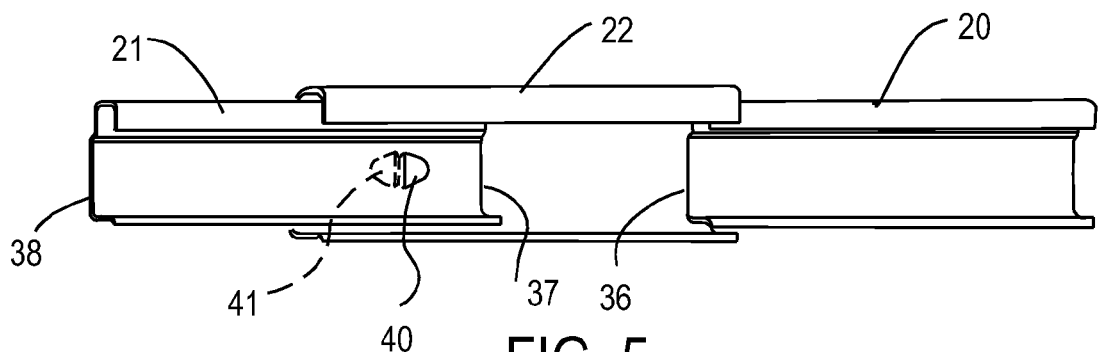
FIG. 5 is a front plan view of a track extension in an extended position.
Figure 6:
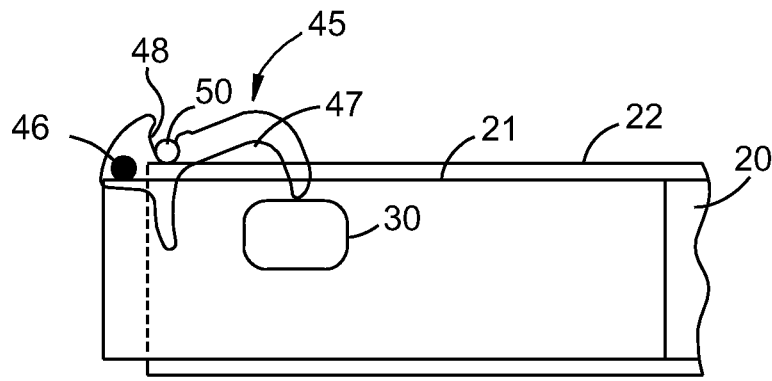
FIGS. 6-10 are front plan views showing a roller interacting with an interlock on the track extension.

The tracks and track bracket are shown in greater detail in FIGS. 4 and 5. Concentric track bracket 22 preferably nestingly receives both primary track 20 and track extension 21. Primary track 20 is also fixedly mounted to the side of the vehicle and extends away from the door opening to a terminus 36. Primary track 20 has the same generally C-shaped cross section with a vertical load portion and horizontal load portion as discussed for track extension 21. When track extension 21 is in its retracted position as shown in FIG. 4, it is locked in coaxial abutment with terminus 36 so that the orthogonal rollers can freely move between primary track 20 and track extension 21. Track extension 21 has a first end 37 and an interlock end 38 to receive an interlock (described below) that prevents the roller bracket from sliding off the end of track extension 21. In order to prevent track extension 21 from sliding off the end of concentric track bracket 22, a stop feature 40 is provided on track extension 21 and a stop feature 41 is provided on concentric track bracket 22 for interfering with one another when track extension 21 reaches its maximum extended position, thereby preventing further movement in the rearward direction of track extension 21. Stops 40 and 41 may preferably comprise an indent and an outdent which are stamped into the respective sheet metal components. A shock absorbing rubber bumper may be provided on the stop features to prevent the user from experience shock or noise at the end of the door travel.

FIGS. 6-10 show the detailed functioning of the present invention. During the door opening process, roller bracket 25 first traverses primary track 20 beginning at the door opening. Roller bracket 25 moves in the opening direction from primary track 20 into track extension 21 and to interlock end 38 while extension track 21 remains locked in the retracted position. When the orthogonal rollers (or, alternatively, some other activating portion of roller bracket 25) enters interlock end 38 then the rollers or other feature are captured at the interlock end and track extension 21 is released within concentric track bracket 22 to slide to the extended position. During the door closing process, an occupant pulls the door in the closing direction so that track extension 21 returns from the extended position to the retracted position. Then the orthogonal rollers are released from the interlock end and track extension 21 is again locked in the retracted position enabling roller bracket 25 to slide through track extension 21 back into primary track 20 for normal closing of the sliding door.

Figure 7:
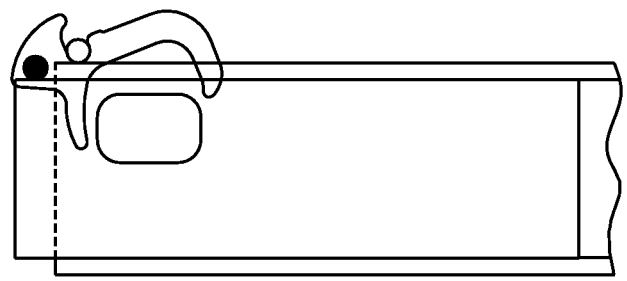
Figure 8:
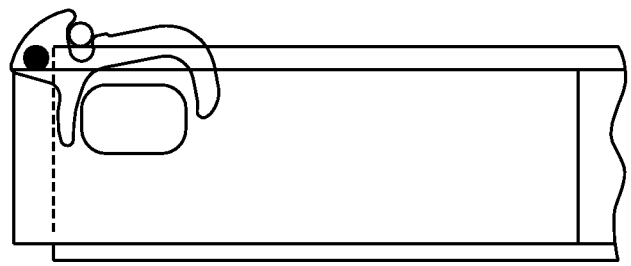
Figure 9:
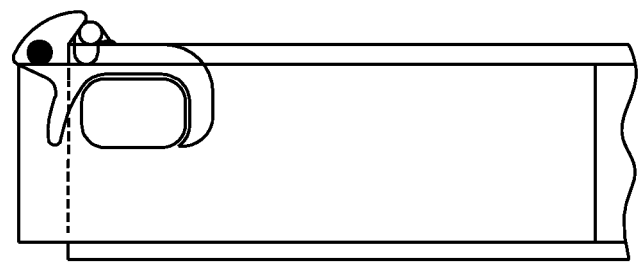
Figure 10:
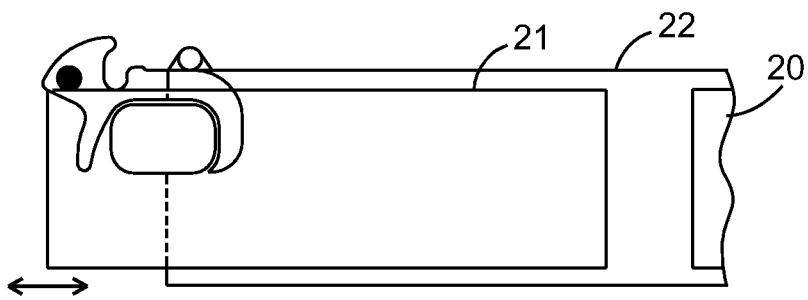

A preferred interlock mechanism of the present invention is also shown in FIGS. 6-10. A lever 45 is mounted by a hinge pin 46 onto track extension 21. Lever 45 has a roller recess 47 adapted to capture a roller 30. Lever 45 also has a capture slot 48 for receiving a fulcrum pin 50 which is mounted on concentric track bracket 22. In the normal locked position shown in FIG. 6, lever 45 is rotated to the maximum extent in the counter clockwise direction with fulcrum pin 50 captured at the end of slot 48. Lever 45 is preferably held in place by a detent mechanism (not shown). In this position, roller 30 clears the leading edge of recess 47 so that it can freely move into or away from recess 47. As shown in FIGS. 7-9, movement of roller 30 toward the left causes clockwise rotation of lever 45 until fulcrum pin 50 escapes slot 48. In the normal unlocked position, roller 30 is fully captured in recess 47 and track extension 21 is released and free to move rearward as shown in FIG. 10 by forces transmitted through roller 30. During the door closing process, the sequence of FIGS. 6-10 is reversed whereby track extension 21 retracts within concentric track bracket 22 causing slot 48 to approach fulcrum pin 50. Because of the sloped surface of slot 48, the action of fulcrum pin 50 against slot 48 causes lever 45 to rotate in the counter clockwise direction until roller 30 is released from recess 47, whereupon track extension 21 becomes locked in the retracted position.

Figure 11:
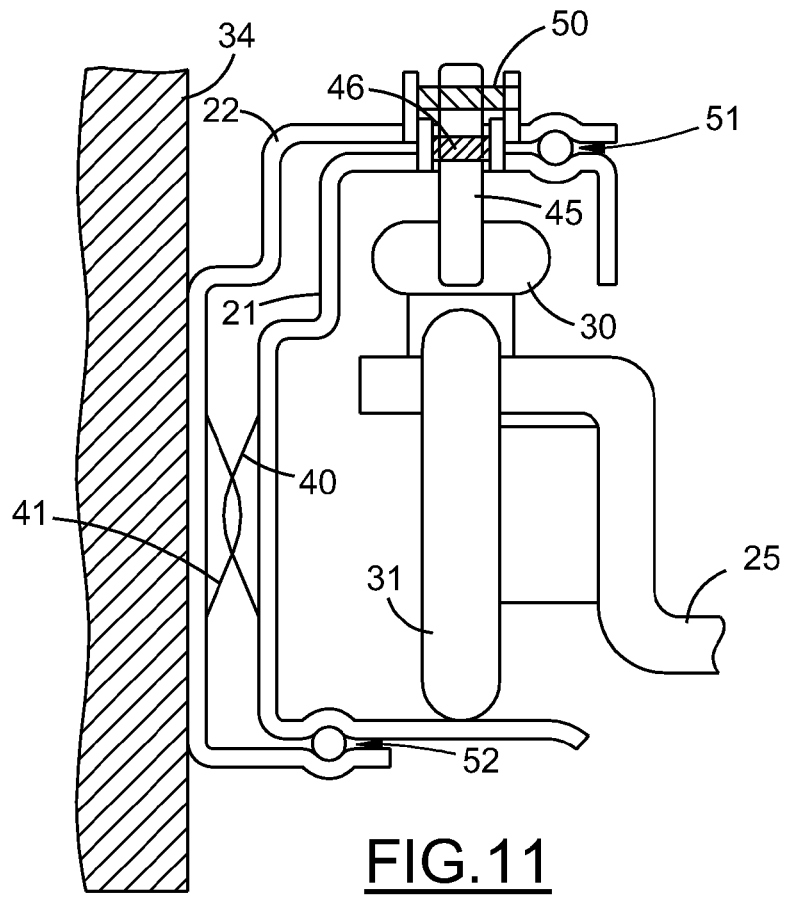
FIG. 11 is an end view showing the embodiment of FIGS. 6-10.

FIG. 11 shows the interlock in an end view wherein appropriate flanges are formed on track extension 21 and concentric track bracket 22 to retain hinge pin 46 and fulcrum pin 50. In addition, bearing races 51 and 52 are shown for achieving the sliding capability of track extension 21 within concentric track bracket 22.

Figure 12:
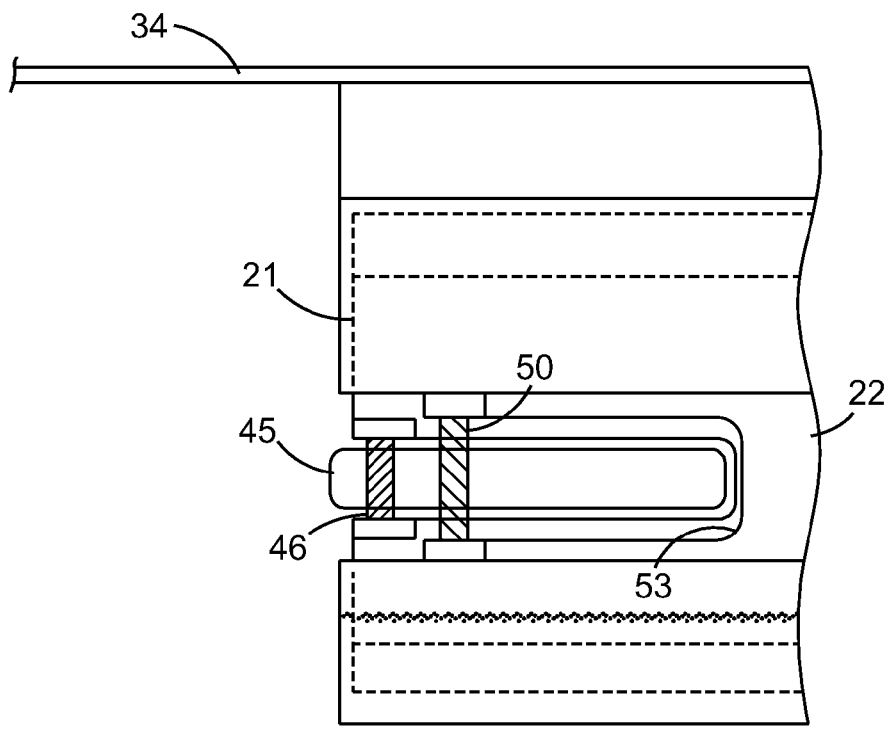
FIG. 12 is a top view showing the interlock system of FIG. 11.

FIG. 12 shows a top view of the interlock mechanism. Concentric track bracket 22 has an upper slot 53 for accommodating the interlock mechanism. Concentric track bracket 22 is shown mounted to one section of a vehicle side panel 34. Depending upon the particular styling of the vehicle, an opening or slot (not shown) may be provided elsewhere in panel 34 for accommodating the roller bracket and track extension (i.e., so that the track extension can slide out through the slot in order to extend beyond the rear end of the vehicle). For aesthetic purposes, it may be desirable to provide an end cap or other finish piece (not shown) at the end of the track extension that plugs the slot in the body panel when the track extension is in the retracted position.

While certain embodiments of the present invention have been described in detail, those familiar with the art to which this invention relates will recognize various alternative designs and embodiments for practicing the invention as defined by the following claims.

What is claimed is:

1. A sliding door system for a vehicle wherein a sliding door slides from a door opening toward a rear end of the vehicle, the system comprising:

a roller bracket having a hinged connection at one end for coupling to the sliding door and having orthogonal rollers at the other end;

a fixed primary track for mounting to a side of the vehicle and extending away from the door opening to a terminus, the primary track having a generally C-shaped cross section with a first vertical load portion and a first horizontal load portion, the first load portions receiving the orthogonal rollers;

a concentric track bracket for mounting to the side of the vehicle and having at least a portion disposed between the terminus of the primary track and the rear end of the vehicle, the concentric track bracket having a generally C-shaped cross section greater than and substantially coaxial with the primary track; and a track extension having a first end and an interlock end, the track extension slidably received in the concentric track bracket between a retracted position and an extended position, wherein the track extension is locked in coaxial abutment with the terminus of the primary track when in the retracted position and wherein the interlock end extends past the rear end of the vehicle when in the extended position, the track extension having a generally C-shaped cross section with a second vertical load portion and a second horizontal load portion, the second load portions aligned with the first load portions, respectively, for receiving the orthogonal rollers when the roller bracket moves from the primary track to the track extension;

wherein when the roller bracket moves in an opening direction from the primary track into the track extension and then to the interlock end, the track extension remains in the retracted position;

wherein when the orthogonal rollers enter the interlock end then they are captured and the track extension is released to slide within the concentric track to the extended position; and wherein when the track extension returns from the extended position to the retracted position then the orthogonal rollers are released from the interlock end, thereby enabling the roller bracket to slide through the track extension and back into the primary track.

2. The system of claim 1 wherein a portion of the concentric track bracket is nested over a portion of the primary track including the terminus.

3. The system of claim 1 wherein the concentric track bracket includes a stop feature for preventing movement of the track extension beyond the extended position.

4. The system of claim 1 wherein the track extension includes a stop feature for preventing movement of the track extension beyond the extended position.

5. The system of claim 1 further comprising a set of ball bearings between the concentric track and the track extension.

6. The system of claim 1 further comprising:
an interlock mechanism including a lever mounted to the track extension and displaced by movement of an orthogonal roller.

7. The system of claim 6 further comprising:
a fulcrum pin fixed with respect to the concentric track and captured by the lever when the orthogonal roller is not at the interlock end, thereby keeping the track extension in the retracted position.

8. A track system for a vehicle having a sliding door, comprising:
a fixed primary track for mounting to a side of the vehicle and extending away from the door opening to a terminus, the primary track having a generally C-shaped cross section with a first vertical load portion and a first horizontal load portion adapted to receive orthogonal rollers of a roller bracket attached to a sliding door;
a concentric track bracket for mounting to the side of the vehicle with at least a portion disposed between the terminus of the primary track and the rear end of the vehicle, the concentric track bracket having a generally C-shaped cross section greater than and substantially coaxial with the primary track; and
a track extension having a first end and an interlock end, the track extension slidably received in the concentric track bracket between a retracted position and an extended position, wherein the track extension has a retracted position locked in coaxial abutment with the terminus of the primary track and an extended position wherein the interlock end extends to a length that would be past the rear end of the vehicle, the track extension having a generally C-shaped cross section with a second vertical load portion and a second horizontal load portion, the second load portions aligned with the first load portions, respectively, for receiving the orthogonal rollers when the roller bracket moves from the primary track to the track extension;

wherein the track extension is adapted to remain in the retracted position when receiving a roller bracket that moves in an opening direction from the primary track into the track extension and then to the interlock end;

wherein the interlock end is adapted to capture the orthogonal rollers and to simultaneously release the track extension to slide within the concentric track to the extended position; and wherein the track extension is adapted to release the orthogonal rollers from the interlock end when it returns from the extended position to the retracted position, thereby enabling the roller bracket to slide through the track extension and back into the primary track.

9. The system of claim 8 wherein a portion of the concentric track bracket is nested over a portion of the primary track including the terminus.

10. The system of claim 8 wherein the concentric track includes a stop feature for preventing movement of the track extension beyond the extended position.

11. The system of claim 8 wherein the track extension includes a stop feature for preventing movement of the track extension beyond the extended position.

12. The system of claim 8 further comprising a set of ball bearings between the concentric track and the track extension.

13. The system of claim 8 further comprising:
an interlock mechanism including a lever mounted to the track extension and displaced by movement of an orthogonal roller.

14. The system of claim 13 further comprising:
a fulcrum pin fixed with respect to the concentric track and captured by the lever when the orthogonal roller is not at the interlock end, thereby keeping the track extension in the retracted position.

* * * * *